(12) United States Patent
Wang et al.

(10) Patent No.: US 9,771,515 B2
(45) Date of Patent: Sep. 26, 2017

(54) PROCESS FOR THE PREPARATION OF GADOLINIUM OXYSULFIDE SCINTILLATION CERAMICS

(71) Applicants: Tsinghua University, Beijing (CN); Nuctech Company Limited, Beijing (CN)

(72) Inventors: Yanchun Wang, Beijing (CN); Qingjun Zhang, Beijing (CN); Yuanjing Li, Beijing (CN); Zhiqiang Chen, Beijing (CN); Ziran Zhao, Beijing (CN); Yinong Liu, Beijing (CN); Yaohong Liu, Beijing (CN); Jianping Chang, Beijing (CN); Shuqing Zhao, Beijing (CN); Wenjian Zhang, Beijing (CN); Yongqiang Wang, Beijing (CN)

(73) Assignees: Tsinghua University, Beijing (CN); Nuctech Company Limited, Beijing (CN)

( * ) Notice: Subject to any disclaimer, the term of this patent is extended or adjusted under 35 U.S.C. 154(b) by 167 days.

(21) Appl. No.: 14/827,248

(22) Filed: Aug. 14, 2015

(65) Prior Publication Data
US 2016/0046860 A1   Feb. 18, 2016

(30) Foreign Application Priority Data

Aug. 14, 2014   (CN) .......................... 2014 1 0399125

(51) Int. Cl.
C09K 11/77      (2006.01)
C04B 35/63      (2006.01)
(Continued)

(52) U.S. Cl.
CPC ...... *C09K 11/7771* (2013.01); *C04B 35/6303* (2013.01); *C04B 35/645* (2013.01); *C04B 35/6455* (2013.01); *G01T 1/2935* (2013.01)

(58) Field of Classification Search
CPC ............ C09K 11/7771; C04B 35/6303; C04B 35/645; C04B 35/6455; G01T 1/2935
See application file for complete search history.

(56) References Cited

U.S. PATENT DOCUMENTS

| 4,747,973 | A | 5/1988 | Cusano et al. |
| 4,752,424 | A | 6/1988 | Matsuda et al. |

(Continued)

FOREIGN PATENT DOCUMENTS

| CN | 101253128 | 8/2008 |
| CN | 101269964 | 9/2008 |

(Continued)

OTHER PUBLICATIONS

First Office Action received from the JPO in counterpart Japanese patent Application No. 2015-159730, dated Oct. 4, 2016 (6 pgs), and English-language translation thereof (8 pgs); 14 pgs total.

(Continued)

*Primary Examiner* — Carol M Koslow
(74) *Attorney, Agent, or Firm* — Knobbe Martens Olson & Bear, LLP

(57) ABSTRACT

The present disclosure is directed to a low cost sintering process for the preparation of gadolinium oxysulfide having a general formula of $Gd_2O_2S$, referred to as GOS, scintillation ceramics, comprising uniaxial hot pressing primary sintering and hot isostatic pressing secondary sintering.

24 Claims, 4 Drawing Sheets

(51) Int. Cl.
    *C04B 35/645*     (2006.01)
    *G01T 1/29*     (2006.01)

(56) References Cited

U.S. PATENT DOCUMENTS

| | | | |
|---|---|---|---|
| 4,863,882 | A | 9/1989 | Matsuda et al. |
| 5,296,163 | A * | 3/1994 | Leppert .................. C04B 35/50 |
| | | | 252/301.4 S |
| 6,384,417 | B1 | 5/2002 | Okumura et al. |
| 6,504,156 | B1 | 1/2003 | Takahara et al. |
| 7,531,109 | B2 | 5/2009 | LaCourse et al. |
| 8,460,602 | B2 * | 6/2013 | Yamamoto ............ C04B 35/645 |
| | | | 204/298.12 |
| 2007/0027025 | A1 | 2/2007 | LaCourse et al. |
| 2012/0178193 | A1 | 7/2012 | Lei et al. |
| 2012/0280184 | A1 * | 11/2012 | Torrecillas San Millan |
| | | | .............................. B82Y 30/00 |
| | | | 252/504 |

FOREIGN PATENT DOCUMENTS

| | | |
|---|---|---|
| CN | 101697367 | 4/2010 |
| CN | 102320840 | 1/2012 |
| DE | 3702357 | 8/1987 |
| JP | 62275072 | 11/1987 |
| JP | 6438491 | 2/1989 |
| JP | 2000171563 | 6/2000 |
| JP | 2001089762 | 4/2001 |
| JP | 2009502716 | 1/2009 |
| WO | WO 2007/015862 | 2/2007 |

OTHER PUBLICATIONS

Office Action and First Search Report dated May 4, 2017 in Chinese application No. CN 2014103991125.6 (6 pgs), and concise English-language summary of same (1 pg); 7 pages total.

Office Action dated Dec. 5, 2016 in German patent application No. DE 102015215493.9 (5 pgs), and English-language translation of relevant portions thereof (2 pgs); 7 pages total.

* cited by examiner

PROCESS FOR THE PREPARATION OF GADOLINIUM OXYSULFIDE SCINTILLATION CERAMICS

CROSS-REFERENCE TO RELATED APPLICATIONS

This application claims priority to Chinese Patent Application No. 201410399125.6, filed on Aug. 14, 2014, which is hereby incorporated by reference in its entirety.

FIELD OF THE INVENTION

The present disclosure relates to a process for the preparation of materials, particularly to a process for the preparation of gadolinium oxysulfide (having the general formula of $Gd_2O_2S$, referred to as GOS) scintillation ceramics.

The present disclosure further relates to gadolinium oxysulfide scintillation ceramics as prepared according to the process of the invention, as well as a high-energy radiation detecting device comprising GOS scintillation ceramics.

BACKGROUND

Rare earth ion-doped GOS having the general formula of $Gd_2O_2S$ ceramic scintillators have many advantages over traditional scintillation monocrystals such as CsI, $CdWO_4$ and the like, including high density, high light yield, stable chemical properties, simple preparation process, and no dissociation during processing. Accordingly, they would be scintillator materials with desired and excellent comprehensive performances for radiation inspection instruments or detectors such as X-ray CT, high-speed X-ray scanners, and security inspection equipments. The Pr and/or Ce ion-doped GOS scintillation ceramics have extremely low afterglow, thereby being an ideal scintillator for CT radiation detectors.

In general, the preparation processes of GOS scintillation ceramics include uniaxial hot pressing process and hot isostatic pressing process. The hot isostatic pressing process comprises the steps of directly sealing scintillation powders in a metal vessel under vacuum conditions, and placing the metal vessel in a gas pressure furnace to conduct hot isostatic pressing sintering, which process have a high requirement to the sealing procedure. The uniaxial hot pressing process requires scintillation powders having small particle size to obtain high surface activity, and generally it would be required that the powders have a surface activity of at least BET 10 $m^2/g$.

SUMMARY OF THE INVENTION

The present invention provides a simple and reliable process for the preparation of GOS scintillation ceramics from commercially available $Gd_2O_2S$ scintillation powders. According to the present invention, the sintering process for the preparation of GOS scintillation ceramics is carried out by two steps, comprising preparing a primary sintered body having closed pores by uniaxial hot pressing sintering; and preparing a secondary sintered body with a high density by using hot iso static pressing sintering process under the atmosphere of inert gas, followed by further treating the resulting secondary sintered body to achieve GOS scintillation ceramics.

In particular, in one aspect of the invention, provided is a process for the preparation of GOS scintillation ceramics, comprising the following steps:

1) adding to GOS scintillation powders a sintering-aid agent, and mixing them to be homogenous;

2) charging the homogenous mixture of the GOS scintillation ceramic powders with the sintering-aid agent into a sintering mould, and subjecting it to uniaxial hot pressing primary sintering, thereby obtaining a GOS primary sintered body;

3) annealing the GOS primary sintered body;

4) subjecting the annealed GOS primary sintered body to secondary sintering using hot isostatic pressing, thereby obtaining a GOS secondary sintered body;

5) subjecting the GOS secondary sintered body to secondary annealing, to obtain GOS scintillation ceramics.

In another aspect of the invention, GOS scintillation ceramics obtained by the process according to the invention are provided.

In another aspect of the invention, an ionizing radiation detector comprising the GOS scintillation ceramics obtained by the process according to the invention is provided.

DESCRIPTION OF THE DRAWINGS

The invention will now be described in greater detail with reference to the accompanying drawings.

DETAILED DESCRIPTION

Figure 1:
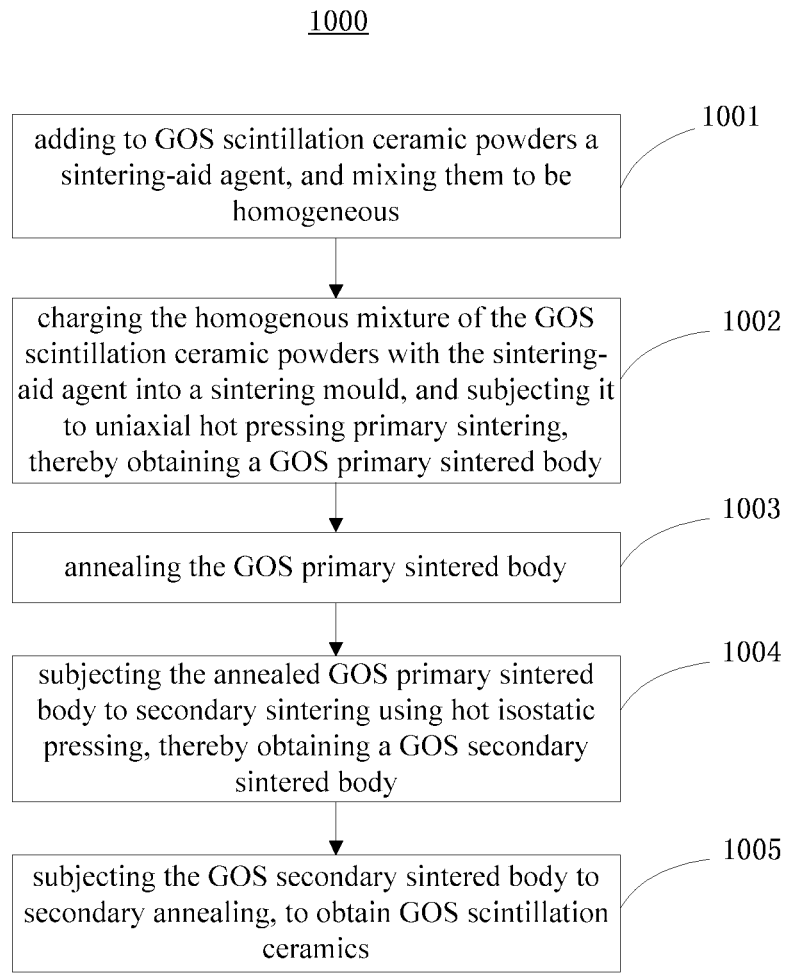
FIG. 1 is a flow chart of a process for the preparation of GOS scintillation ceramics according to an embodiment of the invention.

FIG. 1 shows a process for the preparation of GOS scintillation ceramics according to an embodiment of the invention. As illustrated in FIG. 1, the process 1000 comprises the following steps of:

At step S1001, adding to GOS scintillation ceramic powders a sintering-aid agent, and mixing them to be homogeneous;

At step S1002, charging the homogenous mixture of the GOS scintillation ceramic powders with the sintering-aid agent into a sintering mould, and subjecting it to uniaxial hot pressing sintering, thereby obtaining a GOS primary sintered body;

At step S1003, annealing the GOS primary sintered body;

At step S1004, subjecting the annealed GOS primary sintered body to secondary sintering using hot isostatic pressing, thereby obtaining a GOS secondary sintered body; and At step S1005, subjecting the GOS secondary sintered body to secondary annealing, thereby obtaining GOS scintillation ceramics.

The combination of two processes avoids the needs to complex powder sealing process in the existing hot isostatic pressing technology and to high active powders in vacuum hot pressing technology, thereby significantly reducing the cost. Moreover, the scintillation ceramics prepared by the process according to the invention have high relative density and fine internal crystal particles and good workability.

Below, the process 1000 for the preparation of GOS scintillation ceramics according to the invention will be described in greater detail. The process 1000 comprises the following steps of:

1) adding a sintering-aid agent to $Gd_2O_2S$:Pr,Ce scintillation powders having a median diameter of 5-9 μm. Preferably, the powders are commercially available, having a purity of no less than 99.995%, preferably no less than 99.999% in which Pr ion is doped in an amount of 500-800 ppm by weight and Ce ion is doped in an amount of 10-50 ppm by weight. Preferably, the sintering-aid agent is LiF and/or $Li_2GeF_6$, and is added in an amount of 0.02-1%, preferably 0.1-1%, relative to the mass of the scintillation ceramic powders. The mixed powders are ball-milled so that they are mixed to be homogeneous, and optionally refined, thereby obtaining powders incorporated with the sintering-aid agent. Preferably, the ball-milling is performed using a planetary ball mill. More preferably, during the ball-milling process, powders are immersed in anhydrous alcohol with MOS grade and/or at the protection atmosphere of inert gas, such as argon gas so that the surfaces of GOS powders are not oxidized during the ball-milling. It is preferred to obtain anyone of two types of powders comprising sintering-aid agent below. Powders having a median diameter of 4-9 μm (hereinafter abbreviated as the primary powders) may be obtained by ball-milling the mixed powders for a short time, such as for 0.5-3 h. Powders having a median diameter of 0.2-4 μm, preferably 1-3 μm (hereinafter abbreviated as the secondary powders) may be obtained by refining with ball-milling for a long time, such as 4-12 hours.

A main function of ball-milling is to refine the powders. In order to obtain powders with a fine particle size, some technicians control the particle size during the chemical preparation stage of powders to obtain the fine powders. However this process is disadvantageous of low yield and high cost. In the present invention, ball-milling is carried out prior to sintering, providing a low cost and a high yield, and is carried out in anhydrous alcohol with MOS grade and/or at the protection atmosphere of inert gas, avoiding the oxidization of the powders.

Preferably, following ball-milling, the slurry is filtrated using pump, placed in a vacuum drying oven to vacuum dry, then grinded and sieved, and preserved for standby and easy to use.

2) charging the ball-milled mixed powders into a sintering mould. The mould is placed in a heat furnace and pre-pressurized to 20-40 MPa, preferably to 25-35 MPa, most preferably to about 30 MPa, and then gradually heated to 1000° C.-1100° C. The temperature is kept for 0.5-1 h. Use of above treatment conditions is for avoiding that the surface pores are closed too quickly so that it is unfavourable for the discharging of inner gas. The powders are continuously heated up to 1250° C.-1600° C. and meanwhile pressurized to 40-200 MPa. Preferably, for the primary powders, the uniaxial hot pressing primary sintering is carried out at the temperature from 1500° C. to 1600° C., preferably from 1520° C. to 1580° C., most preferably about 1550 and at the pressure from 150 to 200 MPa, most preferably 200 MPa for 2-5 h. For the secondary powders, the uniaxial hot pressing primary sintering is carried out at the temperature preferably from 1250° C. to 1400° C., more preferably of 1300° C., and at the pressure preferably from 50-150 MPa, more preferably of 60 MPa for 2-5 h. After that, the powders are cooled at the rate of 2-10° C./min, preferably of 4-7° C./min, most preferably of 5° C./min so that GOS ceramics are obtained.

3) The GOS sintered body is annealed at the temperature ranging from 1000° C. to 1200° C., preferably in a muffle furnace, and is subjected to the secondary sintering with hot isostatic pressing process under argon atmosphere at a temperature of from 1300° C. to 1500° C. under a pressure of 150-250 MPa, preferably of 180-220 MPa, and more preferably of 200 MPa. The secondary sintered body is annealed, preferably at the temperature ranging from 1000° C. to 1200° C., and more preferably in a muffle furnace. The resultant GOS ceramics are coarsely grinded, finely grinded, cut, and polished, yielding GOS scintillation ceramics.

According to the process for the preparation of GOS scintillation ceramics of the invention, the step of the hot isostatic pressing secondary sintering to the primary sintered body having compacted structure does not need vacuum sealing process in conventional hot isostatic pressing sintering process where GOS powders are required to be encapsulated into a metal sheath under vacuum, so it is an easy process technically. In the process of the present invention, the powders to be sintered may be obtained by ball-milling and refining, which process does not need the preparation technology of powders having a high specific surface activity and a fine particle size in conventional vacuum hot pressing sintering process, and the hot pressing process with high pressure. With the two-step sintering method according to the process of the invention, transparent GOS scintillation ceramics having excellent performances can be prepared from commercially available GOS powders with a larger particle size by controlling the sintering process parameters, such as the temperature for sintering, the heating rate, period for keeping the temperature, pressure and the like, thereby reducing the technical difficulties and the cost of production, being favorable to expand the application fields of GOS scintillation ceramics, for example from the conventional field of medical radiation imaging to large-scale applications in the field of radiation imaging for security inspection which requires a lower cost.

Several main steps according to the present invention will be described below in greater detail with reference to more accompanying drawings.

I. Treatments of GOS Powders

The commercial $Gd_2O_2S$:Pr,Ce scintillation powders having a median diameter of 5-9 μm and a purity of 99.999% are provided. LiF and/or $Li_2GeF_6$ sintering-aid agent(s) is/are added in an amount of 0.02-1%. The mixture is placed in a completely cleaned polyurethane milling jar. Polished high density yttria stabilized zirconia grinding balls are added, wherein the ratio for large, medium and small balls having the diameters of 10 mm, 6 mm, 3 mm, respectively, is 1:3:10 by mass. The mass ratio of the balls and powders is (3-10):1. During ball-milling, the powders are immersed in high purity anhydrous alcohol with MOS grade and/or at the protection atmosphere of an inert gas (preferably argon), so that the surfaces of GOS powders are not oxidized during the ball-milling. With above milling, two types of powders incorporated with the sintering-aid agent below are obtained. The Primary powders having a median diameter of 4-9 μm is obtained by ball-milling the mixed powders for a short time, such as for 0.5-3 h. The Secondary powders having a median diameter of 0.2-4 μm, preferably 1-3 μm is obtained by refining with ball-milling for a long time, such as 4-36 hours. The sintering-aid agent is present in a mass ratio of 0.02-1%, preferably 0.1-1%, based on the mass of scintillation ceramic powders. If the amount of the sintering-aid agent is too low, the effects of compacting ceramics would not be sufficient. If the amount is too high, a second phase would be formed and another light scattering center would be produced, thereby damaging the improvement of light transmittance of ceramics.

II. Sintering of GOS Scintillation Ceramics

Figure 2:
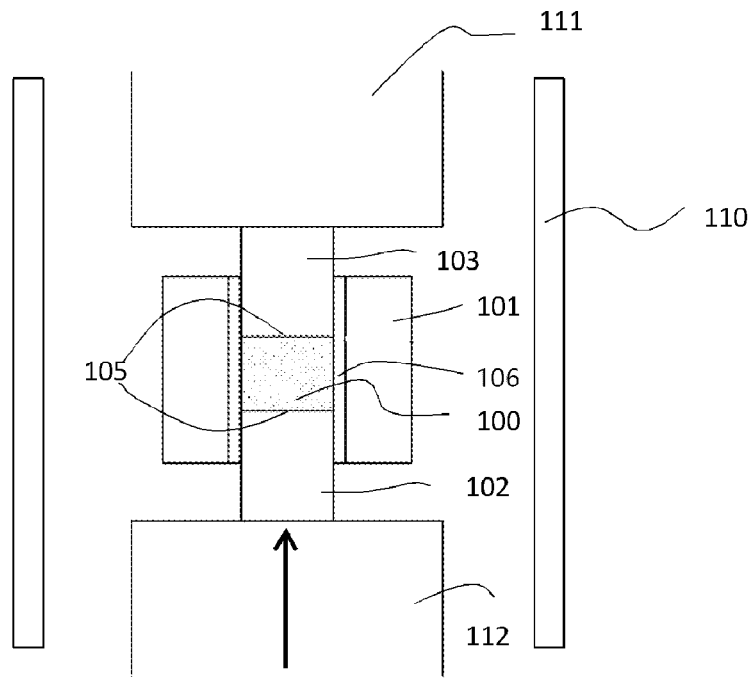
FIG. 2 is a schematic diagram of a device for uniaxial hot pressing primary sintering according to an embodiment of the invention.

FIG. 2 is a schematic diagram of a device for hot pressing primary sintering according to an embodiment of the invention. As illustrated in FIG. 2, the mixed powders 100 comprising a sintering-aid agent are filled in a sintering mould 101-103. The mould is placed in a heat furnace and pre-pressurized to 20-40 MPa, and gradually heated to 1000-1100° C. with the heating unit 110 in the heat furnace. The temperature is kept for 0.5-1 hour. The powders are continuously heated up to 1250° C.-1600° C., meanwhile applying axial pressure (40-200 MPa) via upper and lower press heads 111 and 112. The temperature is kept for 2-5 hours. At the above conditions, the powders are subjected to uniaxial hot pressing sintering. At the end of sintering, the temperature is reduced at the rate of 2-10° C./min to obtain GOS primary sintered body.

The temperature for the hot pressing sintering should be as low as possible. If the temperature for sintering is too high, crystal particles would grow too quick, leading to coarse crystal particles and rough crystal boundary. As a result, the final ceramics are hard and brittle, are prone to crack during processing, and have low surface smoothness. In addition, the higher the temperature is, the more diffusion of mould material would occur, causing more serious contamination to GOS ceramics. High pressure for the hot pressing sintering helps to improve the density of the primary sintered body. In the case that the pressure for the hot pressing sintering is lower than 40 MPa, it is difficult to form closed pores and to increase the compactness by secondary sintering of gas using hot isostatic pressing. In the case that the pressure for hot pressing sintering is higher than 200 MPa, the mould material for the hot pressing sintering is not capable of withstanding the high pressure.

In order to achieve the above conditions, the sintering mould is selected from a mould made of isostatic pressing graphite material, that is capable of withstanding the pressure of 60 MPa with low cost, and a mould made of carbon fiber composite, that is capable of withstanding the pressure of 200 MPa with high cost. For ease of mould release, graphite paper is used and/or boron nitride mold release agent is spray coated, between powders and the mould. In order to reduce the contamination to scintillation ceramics caused by the diffusion of carbon, hot pressing mould is lined with BN (boron nitride) ceramic cylinder, 106 and 107. In the pressure axis direction, BN ceramic chip 105 is firstly placed on the side of contacting scintillation powders, then graphite paper is laminated thereon, and then compression bars of graphite or carbon fiber composite is set up.

The temperature for the hot pressing primary sintering should be as low as possible as long as all pores are closed in sintered body. With such a low temperature, the following effects are achieved, such as avoiding the premature completion of sintering of ceramics, closing all of the pores inside the crystal particles of ceramics, and further avoiding the excessive growth of crystal particles. The excessive growth of crystal particles would cause ceramics to be easy to produce brittle rupture/crack and to be hard to be processed into scintillator arrays having fine size (such as 1.39 mm×3 mm×1.5 mm, with spacing of 0.18 mm).

Figure 3:
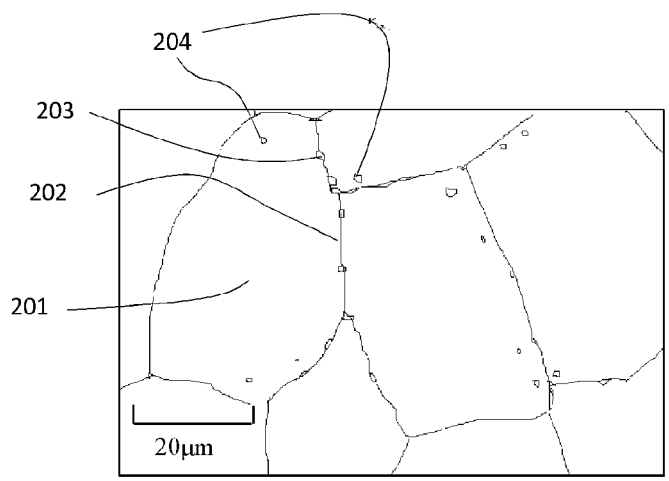
FIG. 3 is a schematic diagram of pores and crystal particles of the GOS uniaxial hot pressing primary sintered body according to an embodiment of the invention.

The GOS sintered body obtained by hot pressing primary sintering has already had a relative density of about 93-99%, and there are few small pores inside the body. As illustrated in FIG. 3, pores 203 are mainly present at the crystal boundaries 202. There are also few pores 204 inside crystal particle 201.

Following the above uniaxial hot pressing sintering, the GOS sintered body is placed in a muffle furnace and subjected to air annealing at the temperature of 800° C.-1200° C. After that, the primary sintered body is directly placed in a hot isostatic pressing furnace for secondary sintering. The secondary sintering is carried out at 1300° C.-1500° C. in an inert gas atmosphere such as argon, helium under 150-250 MPa by keeping the temperature for 2-5 hours and subsequently reducing it gradually, thereby obtaining the final GOS ceramic sintered body. With the secondary sintering using hot isostatic pressing, pores inside the GOS ceramics are significantly decreased, as shown below. The temperature for the hot isostatic pressing secondary sintering is very important. If the temperature is lower than 1300° C., then the compactness of the final ceramics would be insufficient and the light transmission is not high. If the temperature is higher than 1500° C., then the ceramic crystal particles would grow abnormally to produce rough and brittle crystal boundary so that it would be very difficult to carry out the subsequent processing of scintillator array.

Figure 4:
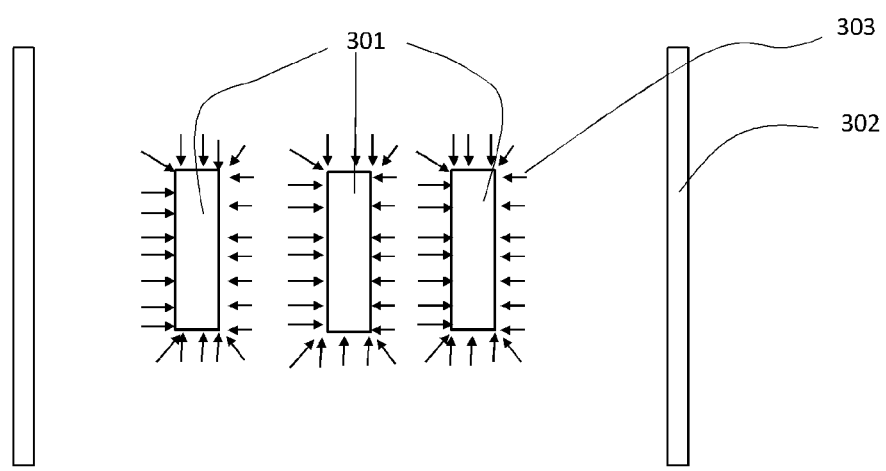
FIG. 4 is a schematic diagram of secondary sintering using hot isostatic pressing according to an embodiment of the invention.
Figure 5:
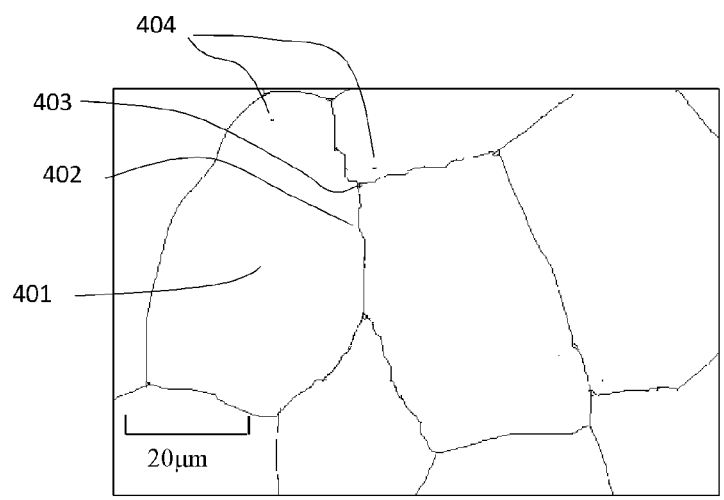
FIG. 5 is a schematic diagram of pores and crystal particles of the GOS hot isostatic pressing secondary sintered body according to an embodiment of the invention.

FIG. 4 shows a schematic diagram of secondary sintering using hot isostatic pressing according to an embodiment of the invention. The efficiency of secondary sintering using hot isostatic pressing is very high. In a single operation, several GOS primary sintered bodies 301 are directly placed in a hot isostatic pressing furnace. The hot isostatic pressing furnace is heated by a heating unit 302 and is fulfilled with high pressure inert gas 303. The pressure of inert gas is uniformly applied on the external surface of the GOS primary sintered bodies. With the secondary sintering using hot isostatic pressing, the inner density of the GOS ceramics is further increased. As schematically shown in FIG. 5, the pore 403 that is originally present at the crystal boundary 402 and the pore 404 that is originally present inside the crystal particle 401 are compressed and substantially disappear, or are reduced to from one-hundredth to one tenth of its original volume, thereby benefiting the reduction of scattering of visible light.

Figure 6:
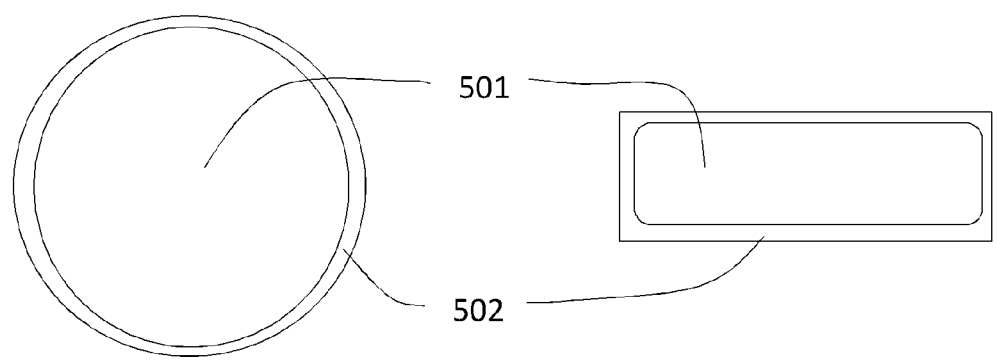
FIG. 6 is a schematic diagram of cross section of the GOS hot isostatic pressing secondary sintered body according to an embodiment of the invention.

The GOS ceramic sintered body subjecting secondary sintering with hot isostatic pressing is schematically shown in FIG. 6, on the surface of which an opaque layer 502 generally having a thickness of 0.5-2 mm is present. The thickness of the opaque layer would increase with the decrease of the density of primary sintered body. The formation of such opaque layer is caused by the penetration of high pressure inert gas into the incompletely closed crystal boundaries and into the formed oxidized layer in the primary sintered body during the hot isostatic pressing sintering. During the secondary sintering using isostatic pressing, cracks occur at the part of original incompletely closed crystal boundaries under high pressure of inert gas, such that the inert gas along cracks at the crystal boundary penetrates into ceramic body to form pores. Moreover, with the gradually permeation of the inert gas, its pressure is gradually reduced and cracks at the crystal boundary gradually disappear beyond the thickness of about 0.5-2 mm. At the inside of the GOS ceramics sintered body, there is GOS scintillation ceramic 501 having low porosity and high compactness. The opaque layer 502 on the surface is cut and grinded. The GOS scintillation ceramics 501 have a relative density of 99.7% or more and good visible light transmittance. The resultant GOS ceramic mass is cut, coarsely grinded, finely grinded, and polished, yielding GOS scintillation ceramics.

In order to efficiently increase the compactness of GOS ceramics during secondary sintering, it is necessary for the primary sintered body obtained by hot pressing sintering to have a relative theoretical density of 93% or more, preferably 95% or more, more preferably 97.5% or more and to have closed pores. In addition, in order to avoid the excessive growth of primary sintering crystal particles which goes against the compact growth of ceramic during secondary sintering, the temperature for primary sintering needs to be controlled and not too high. Meanwhile, relatively low temperature for uniaxial hot pressing sintering benefits the reduction of contamination caused by the diffusion of carbon. In other words, under the conditions of given powder activity and pressure, it is required that the temperature for primary hot pressing sintering could reach the lowest temperature required for the formation of closed pores, and is as low as possible. For the GOS powders having particle size of 1-9 μm, the temperature for hot pressing sintering is 1250-1600° C. under the pressure of 50-250 MPa. If the temperature is higher than 1600° C., then excessive sintering occurs. Although the density could reach 99.9% at that temperature, it leads to serious contamination caused by the diffusion of carbon, bad light transmission, excessive growth of crystal particles, coarse crystal particles, very brittle ceramic body and be difficult to be subjected to the subsequent processing of scintillator array.

The invention will be further illustrated by specific examples hereinafter. It should be understood that these examples are included merely for purposes of illustration and the present invention is not limited thereto.

EXAMPLES

Examples 1-5

100 g of commercial $Gd_2O_2S$:Pr,Ce scintillator powder having a purity of 99.999% and a particle size distribution of d(0.1) of 4.0 μm, d(0.5) of 6.8 μm, and d(0.9) of 10.1 μm was weighted. To the powder, 0.2 g of $Li_2GeF_6$ sintering-aid agent was added. A polyurethane milling jar having an inner diameter of 100 mm and a height of 100 mm was charged with above formed mixture, 500 g of high density yttria stabilized zirconia grinding balls with a given size distribution, and 300 ML high purity anhydrous ethanol with MOS grade under the atmosphere of argon tank. The milling jar was placed in a planetary ball mill Ball-milling was carried out at the rate of 500 rpm for 1 hour, with the interval between forward and reverse of 0.5 h.

The polyurethane milling jar and zirconia grinding balls needed to be pre-washed. The method for pre-washing was as follows: 500 g of high density yttria stabilized zirconia grinding balls were placed in milling jar, in which 35 g of the balls has a diameter of 10 mm, 105 g of the balls has a diameter of 6 mm, and 360 g of the balls has a diameter of 3 mm. To the milling jar, 50 g of GOS powder and 500 mL of anhydrous alcohol were added. The ball-milling was carried out in planetary ball mill for 35 hours. Then, the liquid slurry in the milling jar was discharged. Following adding high purity anhydrous alcohol in MOS grade, ball-milling was repeated once. Subsequently, grinding balls and jar mill were washed by high purity anhydrous alcohol in MOS grade for three times. With the above pre-washing treatment, the impurities that could easily drop out from the surface of zirconia grinding balls may be cleaned. In addition, ball-milling for a long period could remove slack structure on the surface of zirconia grinding balls as much as possible and retain the compact and firm grinding ball structure, which would benefit the reduction of the contamination caused by ball-milling impurities.

The ball milled powders had a particle size distribution of d(0.1) of 3.5 μm, d(0.5) of 6.4 μm, and d(0.9) of 10 μm.

The ball milled GOS powders were charged in a graphite mould having an inner diameter of 50 mm, and were subjected to uniaxial hot pressing primary sintering. The sintering temperatures for examples were in the range of 1450-1650° C., respectively (see Table 1 below, with an interval of 50° C. between each examples). The pressure was 60 MPa. The vacuum degree in furnace was $1*10^{-2}$ Pa. The temperature and pressure were kept for 2 hours. At the end of the maintenance of temperature, the cooling procedure was carried out at a cooling rate of 5° C./min After cooling to room temperature, the primary sintered body was removed.

When the BN and graphite impurities adhered on the surface of the GOS primary sintered body were removed by rubbing, the sintered body was placed in a muffle furnace and annealed at 1000° C. for 2 hours. After cooling in the furnace, the annealed sintered body was removed and was placed in hot isostatic pressing furnace to conduct secondary sintering. In the secondary sintering, the temperature was slowly increased to 1400° C. and argon was charged until the pressure was 200 MPa. The sintering was carried out for 2 hours while keeping the temperature and the pressure. After slow cooling of sintering furnace, the samples were taken out, i.e. the secondary sintered body. The secondary sintered body was subjected to secondary annealing, i.e. at 1000° C. for 2 hours. The samples were coarsely grinded, finely grinded and polished, yielding GOS:Pr,Ce,F scintillation ceramics.

Examples 6 and 7

The scintillation powders were ball-milled and mixed by using the same process as those in Examples 1-5, thereby obtaining powders having the same particle size distribution. The powders were charged in carbon fiber composite mould having an inner diameter of 50 mm and subjected to uniaxial hot pressing primary sintering. The sintering temperatures for examples were at 1500° C. and 1550° C. The pressure was 200 MPa. The vacuum degree was 1-15 Pa. The temperature and pressure were kept for 2 hours. At the end of the maintenance of temperature, the cooling procedure was carried out at a cooling rate of 10° C./min After cooling to room temperature, the sintered body was removed, obtaining the GOS primary sintered body. The samples of Examples 6-7 were subjected to the same annealing and secondary sintering using hot isostatic pressing as well as the further treatments as those in Examples 1-5, yielding GOS:Pr,Ce,F scintillation ceramics.

Examples 8-11

100 g of commercial Gd2O2S:Pr,Ce scintillator powder having a purity of 99.999% and a particle size distributaion of d(0.1) of 4.0 μm, d(0.5) of 6.8 μm, and d(0.9) of 11.8 μm was weighted. 0.2 g of LiF sintering-aid agent was added. The mixture was placed in planetary ball mill according to the operations in Examples 1-5, and ball-milled and refined at the rate of 500 rpm for 7 hour, with an interval between forward and reverse operations of 0.5 h. The ball-milled mixed powders had a particle size distribution of d(0.1) of 1.1 μm, d(0.5) of 2.1 μm, and d(0.9) of 3.8 μm.

The powders were charged in a graphite mould having an inner diameter of 50 mm, and were subjected to vacuum hot pressing primary sintering. The sintering temperatures were 1300 and 1400° C., respectively. The pressure was 60 MPa. The vacuum degree was $5*10^{-2}$ Pa. The temperature and pressure were kept for 2 hours. At the end of sintering, the cooling procedure was carried out at a cooling rate of 5° C./min After cooling to room temperature, the sintered body was removed.

The samples of Examples 8-11 were subjected to annealing and secondary sintering using hot isostatic pressing as well as the further treatment according to Examples 1-5, yielding GOS:Pr,Ce,F scintillation ceramics.

Example 12

The scintillation powders were ball-milled and mixed by using the same process as those in Examples 8-11, thereby obtaining powders having the same particle size distribution. The powders were charged in carbon fiber composite mould having an inner diameter of 50 mm and subjected to vacuum hot pressing primary sintering. The sintering temperatures was 1300° C. The pressure was 200 MPa. The vacuum degree was $5*10^{-2}$ Pa. The temperature and pressure were kept for 2 hours. At the end of the maintenance of temperature, the cooling procedure was carried out at a cooling rate of 5° C./min After cooling to room temperature, the sintered body was removed, obtaining the GOS primary sintered body. The sample of Example 12 was subjected to the same annealing and secondary sintering using hot isostatic pressing as well as the further treatment as those in Examples 1-5, yielding GOS:Pr,Ce,F scintillation ceramics.

Table 1 shows the parameters for sintering and the final performances of the resultant scintillation ceramics of above Examples 1-12.

is particularly suitable for X-ray computerized tomography (X-CT) equipment and/or X-ray luggage scanner in which the scintillator is required to have low afterglow.

Due to the low cost of the process according to the invention, the prepared scintillator is especially suitable for use in X-ray luggage scanner and/or X-ray computerized tomography (X-CT) equipment for security inspection.

The scintillation ceramics according the invention have good performance and are also useful for X-CT detector in the field of medical imaging.

The invention claimed is:

1. A process for the preparation of gadolinium oxysulfide (GOS) scintillation ceramics, comprising:
    adding to GOS scintillation ceramic powders a sintering-aid agent, and mixing them to be homogeneous;
    charging the homogenous mixture of the GOS scintillation ceramic powders with the sintering-aid agent into a sintering mould, and subjecting it to uniaxial hot pressing primary sintering, thereby obtaining a GOS primary sintered body;
    annealing the GOS primary sintered body;
    subjecting the annealed GOS primary sintered body to secondary sintering using hot isostatic pressing, thereby obtaining a GOS secondary sintered body;
    subjecting the GOS secondary sintered body to secondary annealing, to obtain GOS scintillation ceramics,
    wherein the uniaxial hot pressing primary sintering comprises:

TABLE 1

| Sample No. | Median diameter of powders/ μm | Temperature for primary sintering/° C. | Pressure for primary sintering/ MPa | Relative density for primary sintered body | Secondary sintering using hot isostatic pressing/° C.-MPa | The final performance |
|---|---|---|---|---|---|---|
| 1 | 6.4 | 1450 | 60 | 93.2% | 1400-200 | good |
| 2 | 6.4 | 1500 | 60 | 95.6% | 1400-200 | good |
| 3 | 6.4 | 1550 | 60 | 96.9% | 1400-200 | good |
| 4 | 6.4 | 1600 | 60 | 98.5% | 1400-200 | excellent |
| 5 | 6.4 | 1650 | 60 | 99.2% | 1400-200 | Brittle rupture during processing |
| 6 | 6.4 | 1500 | 200 | 99.1% | 1400-200 | excellent |
| 7 | 6.4 | 1550 | 200 | 99.3% | 1400-200 | excellent |
| 8 | 2.1 | 1200 | 60 | 94.8% | 1400-200 | low transmittance |
| 9 | 2.1 | 1300 | 60 | 96.2% | 1400-200 | good |
| 10 | 2.1 | 1350 | 60 | 97.8% | 1400-200 | excellent |
| 11 | 2.1 | 1400 | 60 | 99.1% | 1400-200 | excellent |
| 12 | 2.1 | 1300 | 200 | 99.7% | 1400-200 | excellent |

As shown in Table 1, the sample No. 8 had a lower relative density and a lower visible light transmittance, because the sintering was insufficient due to the relatively low temperature and the pressure for sintering. For the sample No. 5, brittle rupture was easy to occur during processing, because the internal crystal particles during secondary sintering grew excessively due to too high temperature for primary sintering. The GOS scintillation ceramics prepared under other parameters had a very excellent light transmittance in visible light band. The ceramic chips having a thickness of 2 mm have an integral transmittance of 30-35% in the range of 500-520 nm and have a good processability.

The GOS scintillation ceramics according to the invention could be used as scintillator element in the detectors for example, solid scintillation detector for detecting ionizing radiation such as X-ray, γ-ray, electron beam and the like. It pre-pressurizing to 20-40 MPa, and gradually heating to 1000° C.-1100° C. and keeping the temperature for 0.5-1 hours; and
    further heating to 1250° C.-1600° C. meanwhile pressurizing to 40-200 MPa, and keeping the temperature for 2-5 hours to carry out the uniaxial hot pressing sintering, yielding the GOS primary sintered body.

2. The process according to claim 1, wherein the mixing is performed by ball-milling to obtain primary scintillation ceramic powders incorporated with the sintering-aid agent having a median diameter of 4-9 μm.

3. The process according to claim 2, wherein for the primary powders, the uniaxial hot pressing primary sintering is carried out at the temperature from 1500° C. to 1600° C., and at the pressure from 150 to 200 MPa.

4. The process according to claim 2, wherein for the primary powders, the uniaxial hot pressing primary sintering is carried out at the temperature from 1520° C. to 1580° C.

5. The process according to claim 2, wherein for the primary powders, the uniaxial hot pressing primary sintering is carried out at the temperature of 1550° C.

6. The process according to claim 2, wherein for the primary powders, the uniaxial hot pressing primary sintering is carried out at the pressure of 200 MPa.

7. The process according to claim 2, wherein the primary annealing comprises the step of annealing the GOS primary sintered body at the temperature ranging from 1000° C. to 1200° C.

8. The process according to claim 1, wherein the mixing is performed by ball-milling, and the process further comprises the step of further refining the mixed powders by ball-milling, to obtain secondary scintillation ceramic powders incorporated with the sintering-aid agent having a median diameter of 0.2-4 μm.

9. The process according to claim 8, wherein said refining obtain secondary scintillation ceramic powders incorporated with the sintering-aid agent having a median diameter of 1-3 μm.

10. The process according to claim 8, wherein for the secondary powders, the uniaxial hot pressing primary sintering is carried out at the temperature from 1250° C. to 1400° C., and at the pressure from 50-150 MPa.

11. The process according to claim 8, wherein for the secondary powders, the uniaxial hot pressing primary sintering is carried out at the temperature of 1300° C.

12. The process according to claim 8, wherein for the secondary powders, the uniaxial hot pressing primary sintering is carried out at the pressure of 60 MPa.

13. The process according to claim 1, wherein the sintering-aid agent is LiF or $Li_2GeF_6$ and is added in an amount of 0.02-1%, based on the mass of the scintillation ceramic powders.

14. The process according to claim 1, wherein the sintering-aid agent is LiF or $Li_2GeF_6$ and is added in an amount of 0.1-1%, based on the mass of the scintillation ceramic powders.

15. The process according to claim 1, wherein the uniaxial hot pressing primary sintering comprises: pre-pressurizing to 25-35 MPa.

16. The process according to claim 1, wherein the uniaxial hot pressing primary sintering comprises: pre-pressurizing to 30 MPa.

17. The process according to claim 1, wherein the primary annealing comprises the step of annealing the GOS primary sintered body at the temperature ranging from 1000° C. to 1200° C.

18. The process according to claim 1, wherein the secondary sintering using hot isostatic pressing comprises the step of subjecting the annealed GOS primary sintered body to secondary sintering using hot isostatic pressing under the atmosphere of inert gas at a temperature of from 1300° C. to 1500° C. under 150-250 MPa.

19. The process according to claim 1, wherein the secondary annealing comprises the step of subjecting the secondary sintered body to secondary annealing at the temperature ranging from 1000° C. to 1200° C.

20. The process according to claim 1, wherein the sintering mould is a mould made of isostatic pressing graphite material or a mould made of carbon fiber composite.

21. The process according to claim 1, wherein the hot pressing mould is lined with BN ceramic cylinder and in the direction pressure axis of pressure axis, a BN ceramic chip is firstly placed on a side of contacting scintillation powders, and then a graphite paper is laminated thereon.

22. The process according to claim 1, wherein the scintillation ceramic powders are $Gd_2O_2S$:Pr,Ce scintillation ceramic powders having a median diameter of 5-9 μm and a purity of 99.999%.

23. The process according to claim 1, wherein for the primary powders, the uniaxial hot pressing primary sintering is carried out at the temperature from 1500° C. to 1600° C., and at the pressure from 150 to 200 MPa.

24. The process according to claim 1, wherein for the primary powders, the uniaxial hot pressing primary sintering is carried out at the temperature from 1520° C. to 1580° C.

* * * * *